(12) United States Patent
Elachqar et al.

(10) Patent No.: US 11,514,695 B2
(45) Date of Patent: Nov. 29, 2022

(54) PARSING AN INK DOCUMENT USING OBJECT-LEVEL AND STROKE-LEVEL PROCESSING

(71) Applicant: Microsoft Technology Licensing, LLC, Redmond, WA (US)

(72) Inventors: Oussama Elachqar, Seattle, WA (US); Badal Yadav, Renton, WA (US); Oz Solomon, Maple (CA); Sergey Aleksandrovich Doroshenko, Redmond, WA (US); Nima Mohajerin, Concord (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 74 days.

(21) Appl. No.: 17/117,152

(22) Filed: Dec. 10, 2020

(65) Prior Publication Data
US 2022/0188541 A1 Jun. 16, 2022

(51) Int. Cl.
*G06V 30/32* (2022.01)
*G06V 10/94* (2022.01)
(Continued)

(52) U.S. Cl.
CPC ......... *G06V 30/347* (2022.01); *G06K 9/6256* (2013.01); *G06V 10/44* (2022.01); *G06V 10/95* (2022.01); *G06V 30/36* (2022.01)

(58) Field of Classification Search
None
See application file for complete search history.

(56) References Cited

U.S. PATENT DOCUMENTS 5,970,170 A * 10/1999 Kadashevich ....... G06V 30/182
382/229
2004/0252888 A1* 12/2004 Bargeron .............. G06F 40/171
382/188
(Continued)

FOREIGN PATENT DOCUMENTS

CN 103077389 A * 5/2013
JP 2012208913 A * 10/2012

OTHER PUBLICATIONS

JP 2012208913 A [Machine Translation] (Year: 2012).*
(Continued)

*Primary Examiner* — Michelle M Entezari

(57) ABSTRACT

Technology is described herein for parsing an ink document having a plurality of ink strokes. The technology performs stroke-level processing on the plurality of ink strokes to produce stroke-level information, the stroke-level information identifying at least one characteristic associated with each ink stroke. The technology also performs object-level processing on individual objects within the ink document to produce object-level information, the object-level information identifying one or more groupings of ink strokes in the ink document. The technology then parses the ink document into constituent parts based on the stroke-level information and the object-level information. In some implementations, the technology converts the ink stroke data into an ink image. The stroke-level processing and/or the object-level processing may operate on the ink image using one or more neural networks. More specifically the stroke-level processing can classify pixels in the input image, while the object-level processing can identify bounding boxes containing possible objects.

20 Claims, 8 Drawing Sheets

(51) Int. Cl.
    *G06V 10/44*        (2022.01)
    *G06K 9/62*         (2022.01)

(56) References Cited

U.S. PATENT DOCUMENTS

| | | | | |
|---|---|---|---|---|
| 2006/0210172 | A1* | 9/2006 | Sutanto | G06V 30/347 |
| | | | | 382/229 |
| 2008/0292190 | A1* | 11/2008 | Biswas | G06F 3/04883 |
| | | | | 382/187 |
| 2014/0361983 | A1* | 12/2014 | Dolfing | G06V 30/32 |
| | | | | 345/156 |
| 2016/0070688 | A1* | 3/2016 | Yao | G06F 40/169 |
| | | | | 715/232 |
| 2016/0328620 | A1* | 11/2016 | Elarian | G06F 21/36 |
| 2018/0025248 | A1* | 1/2018 | Shan | G06V 30/373 |
| | | | | 382/189 |
| 2018/0150974 | A1* | 5/2018 | Abe | G06K 9/6256 |
| 2020/0082153 | A1* | 3/2020 | Holden | G06V 30/2268 |
| 2020/0302163 | A1* | 9/2020 | Shi | G06V 30/347 |
| 2021/0224528 | A1* | 7/2021 | Mannby | G06V 30/387 |
| 2021/0272341 | A1* | 9/2021 | Swaminathan | G06T 7/11 |
| 2022/0156486 | A1* | 5/2022 | Chen | G06T 7/10 |

OTHER PUBLICATIONS

CN 103077389 A [machine translation] (Year: 2013).*
Yi C, Tian Y. Localizing text in scene images by boundary clustering, stroke segmentation, and string fragment classification. IEEE Transactions on Image Processing. May 15, 2012;21(9):4256-68. (Year: 2012).*
Huang W, Lin Z, Yang J, Wang J. Text localization in natural images using stroke feature transform and text covariance descriptors. InProceedings of the IEEE international conference on computer vision 2013 (pp. 1241-1248). (Year: 2013).*
Bhat A, Hammond T. Using Entropy to Distinguish Shape Versus Text in Hand-Drawn Diagrams. InIJCAI Jan. 1, 2009 (vol. 9, pp. 1395-400). (Year: 2009).*
Julca-Aguilar, et al., "Symbol Detection in Online Handwritten Graphics Using Faster R-CNN," in 2018 13th IAPR International Workshop on Document Analysis Systems (DAS), 2018, pp. 151-156.
Nagaoka, et al., "Text Detection by Faster R-CNN with Multiple Region Proposal Networks," in 2017 14th IAPR International Conference on Document Analysis and Recognition (ICDAR), 2017, pp. 15-20.
Bishop, et al., "Distinguishing Text from Graphics in On-line Handwiillen Ink," in Proceedings of the 9th Int'l Workshop on Frontiers in Handwriting Recognition, 2004, 6 pages.
Yang, et al., "Handwriting Text Recognition Based on Faster R-CNN," in 2019 Chinese Automation Congress (CAC), 2019, pp. 2450-2454.
PCT Search Report and Written Opinion for International Application No. PCT/US2021/058506, dated Feb. 28, 2022, 12 pages.
Ye, et al., "Grouping Text Lines in Freeform Handwritten Notes," in Proceedings of the Eight International Conference an Document Analysis and Recognition, 2005, 5 pages.
Wang, et al., "Parsing Ink Annotations on Heterogeneous Documents," in Proceedings of the Third Eurographics Conference on Sketch-Based Interfaces and Modeling, Sep. 2006, 8 pages.
Ronneberger, et al., "U-Net: Convolutional Networks for Biomedical Image Segmentation," arXiv:1505.04597v1 [cs.CV], May 18, 2015, 8 pages.
Redmon, et al., "You Only Look Once: Unified, Real-Time Object Detection," arXiv:1506.02640v5 [cs.CV], May 9, 2016, 10 pages.
He, et al., "Deep Residual Learning for Image Recognition," arXiv:1512.03385v1 [cs.CV], Dec. 10, 2015, 12 pages.
Redmon, et al., "YOLO9000: Better, Faster, Stronger," arXiv:1612.08242v1 [cs.CV], Dec. 25, 2016, 9 pages.
Redmon, et al., "YOLOv3: An Incremental Improvement," arXiv:1804.02767v1 [cs.CV], Apr. 8, 2018, 6 pages.
Li, Ethan Yanjia, "Dive Really Deep into YOLO v3: A Beginner's Guide," available at https://towardsdatascience.com/dive-really-deep-into-yolo-v3-a-beginners-guide-9e3d2666280e, Towards Data Science, Dec. 30, 2019, 19 pages.
K., Sambasivarao, "Non-maximum Suppression (NMS)," available at https://towardsdatascience.com/non-maximum-suppression-nms-93ce178e177c. Towards Data Science, Oct. 1, 2019, 8 pages.
Ren, et al., "Faster R-CNN: Towards Real-Time Object Detection with Region Proposal Networks," arXiv:1506.01497v3 [cs.CV], Jan. 6, 2016, 14 pages.
Liu, et al., "SSD: Single Shot MultiBox Detector," arXiv:1512.02325v5 [cs.CV], Dec. 29, 2016, 17 pages.

* cited by examiner

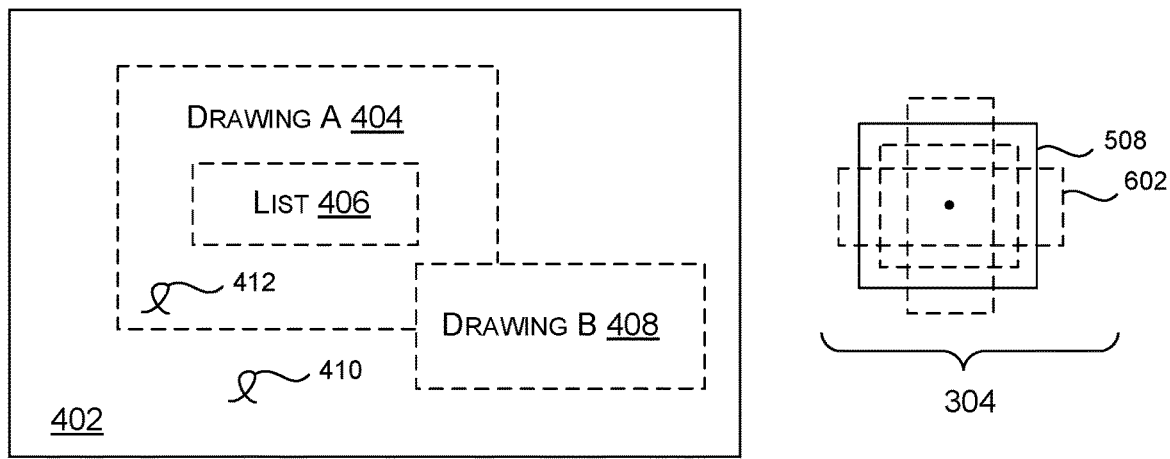
CLASSIFICATION RESULT
FIG. 4
FIG. 6
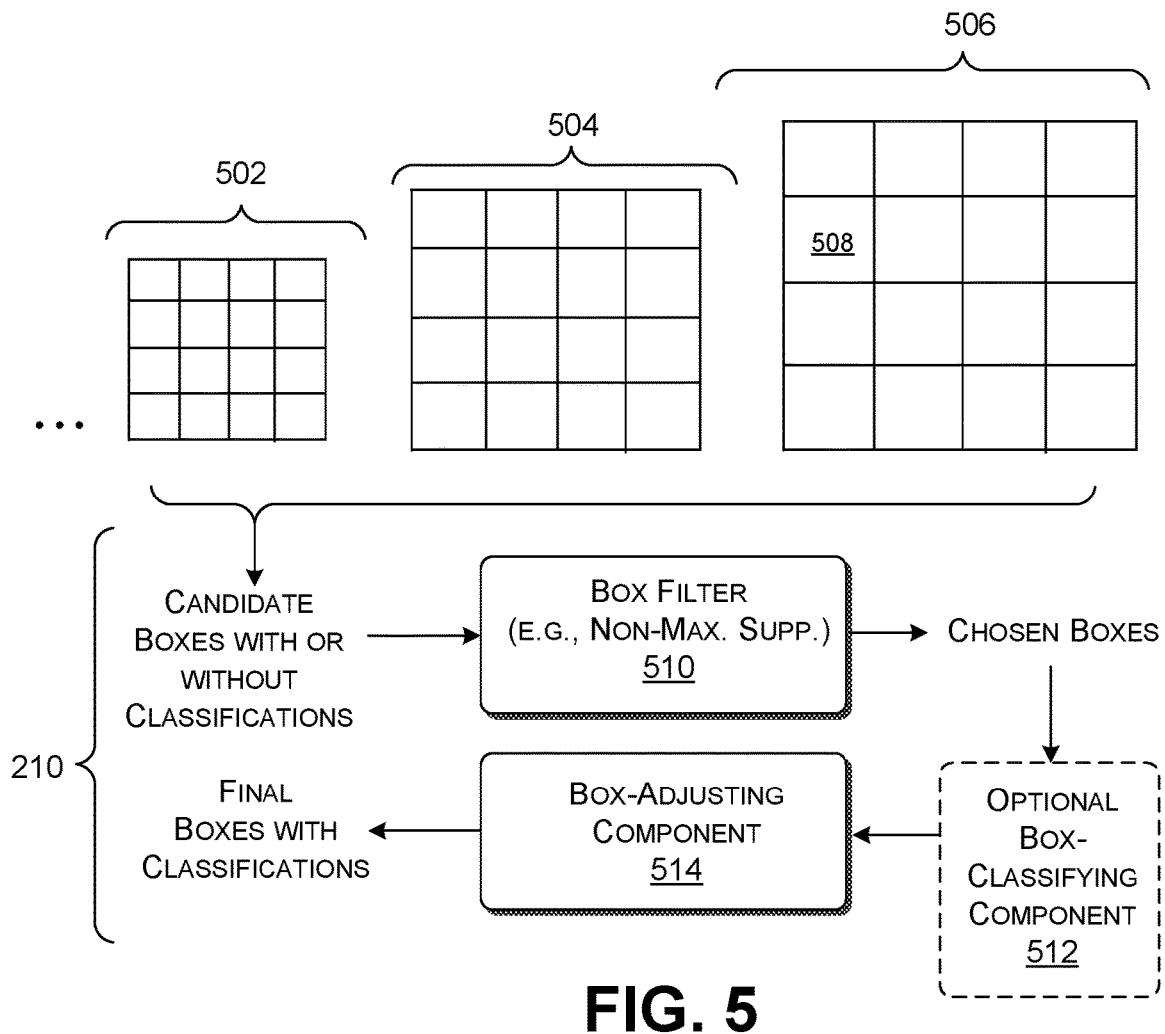
FIG. 5

OVERVIEW OF ONE PARSING RULE 1002

DETERMINE A STROKE-BASED CLASSIFICATION ASSOCIATED WITH A PARTICULAR INK STROKE BASED ON THE STROKE-LEVEL INFORMATION.
1004

DETERMINE AN OBJECT-BASED CLASSIFICATION ASSOCIATED WITH A PARTICULAR OBJECT, THE PARTICULAR OBJECT BEING ASSOCIATED WITH A REGION IN THE INK IMAGE, AND BEING ASSOCIATED WITH A PARTICULAR GROUPING OF INK STROKES.
1006

DETERMINE WHETHER THE PARTICULAR INK STROKE INTERSECTS THE REGION ASSOCIATED WITH THE PARTICULAR OBJECT.
1008

DETERMINE WHETHER THE PARTICULAR INK STROKE IS A MEMBER OF THE PARTICULAR OBJECT BASED ON A RULE THAT SPECIFIES THAT: THE PARTICULAR INK STROKE IS A MEMBER OF THE PARTICULAR OBJECT WHEN THE PARTICULAR INK STROKE INTERSECTS THE REGION BY AT LEAST A PRESCRIBED AMOUNT, AND THE PARTICULAR INK STROKE AND THE PARTICULAR OBJECT HAVE A SAME CLASSIFICATION; AND THE PARTICULAR INK STROKE IS NOT A MEMBER OF THE PARTICULAR OBJECT WHEN THE PARTICULAR INK STROKE AND THE PARTICULAR OBJECT DO NOT HAVE A SAME CLASSIFICATION.
1010

FIG. 10

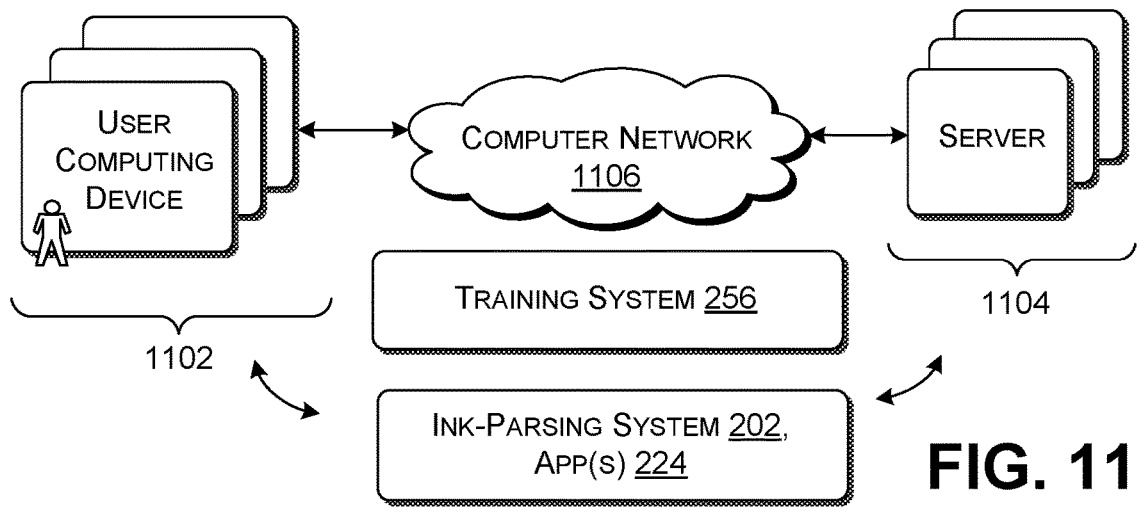

FIG. 11

PARSING AN INK DOCUMENT USING OBJECT-LEVEL AND STROKE-LEVEL PROCESSING

BACKGROUND

Digital ink documents are documents that a user creates by interacting with a digitizer using some kind of writing implement, such as a pen or finger. These kinds of documents may be relatively complex. For instance, a single ink document can include different types of content items, including paragraphs, lists, drawings, charts, etc. These content items may exhibit different sizes, orientations, user writing styles, etc. Further, some ink documents may include overlapping content items. For example, an ink document may include a drawing with an embedded list. Another ink document may include a drawing that overlaps with another drawing, etc. Finally, different computing platforms may represent the digital ink strokes which compose an ink document in different respective ways.

A parsing engine performs the task of detecting different content items in an ink document. This task is technically challenging due to the above-identified factors. A parsing engine may also be required to run in an efficient manner on a resource-constrained computing platform, such as that used in smartphones and other handheld devices; this factor further compounds the technical challenges facing the development of a successful parsing engine.

SUMMARY

Technology is described herein for parsing an ink document having a plurality of ink strokes. The technology performs stroke-level processing on the plurality of ink strokes to produce stroke-level information. For each ink stroke in the ink document, the stroke-level information identifies at least one characteristic that can be used to classify the ink stroke. The technology also performs object-level processing on individual objects within the ink document to produce object-level information. The object-level information identifies one or more groupings of ink strokes in the ink document. The technology then parses the ink document into its constituent parts based on the stroke-level information and the object-level information.

In some implementations, the technology converts ink stroke data into an ink image. The stroke-level processing and/or the object-level processing may operate on the ink image.

In some implementations, the stroke-level processing uses a neural network to determine the classifications of individual pixels in the ink image.

In some implementations, the object-level processing uses a neural network to identify bounding boxes in the ink image which include respective objects. Each object, in turn, is associated with a cluster of ink strokes.

In some implementations, the technology performs the parsing by applying one or more rules. One rule deems a particular ink stroke to be a member of a particular object when: the particular ink stroke intersects a region associated with the particular object by at least a prescribed amount; and the particular ink stroke and the particular object have a same classification.

According to one technical characteristic, the technology achieves high parsing accuracy by leveraging the above-summarized two modes of parsing analysis. More specifically, by combining stroke-level processing and object-level processing together, the technology can correctly parse ink documents having even complex layouts. For instance, the technology can correctly determine the object-affiliation of a particular ink stroke within a region in which two objects having different classifications intersect. In some implementations, the technology is also computationally efficient, in part, because its stroke-level analysis path and its object-level analysis path overlap in part, and thus may share computing resources.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 shows another example of the operation of the ink-parsing system of FIG. 2.

FIG. 5 shows illustrative details of the object-level processor of FIG. 2.

FIG. 6 shows illustrative anchor boxes that the object-level processor of FIG. 5 may using to identify candidate bounding boxes within an ink document.

FIG. 10 is a flowchart that provides details regarding an ink-classifying operation performed by the ink-parsing systems of FIGS. 1 and 2.

FIG. 11 shows illustrative computing equipment that can be used to implement the ink-parsing system of FIGS. 1 and 2.

Figure 1:
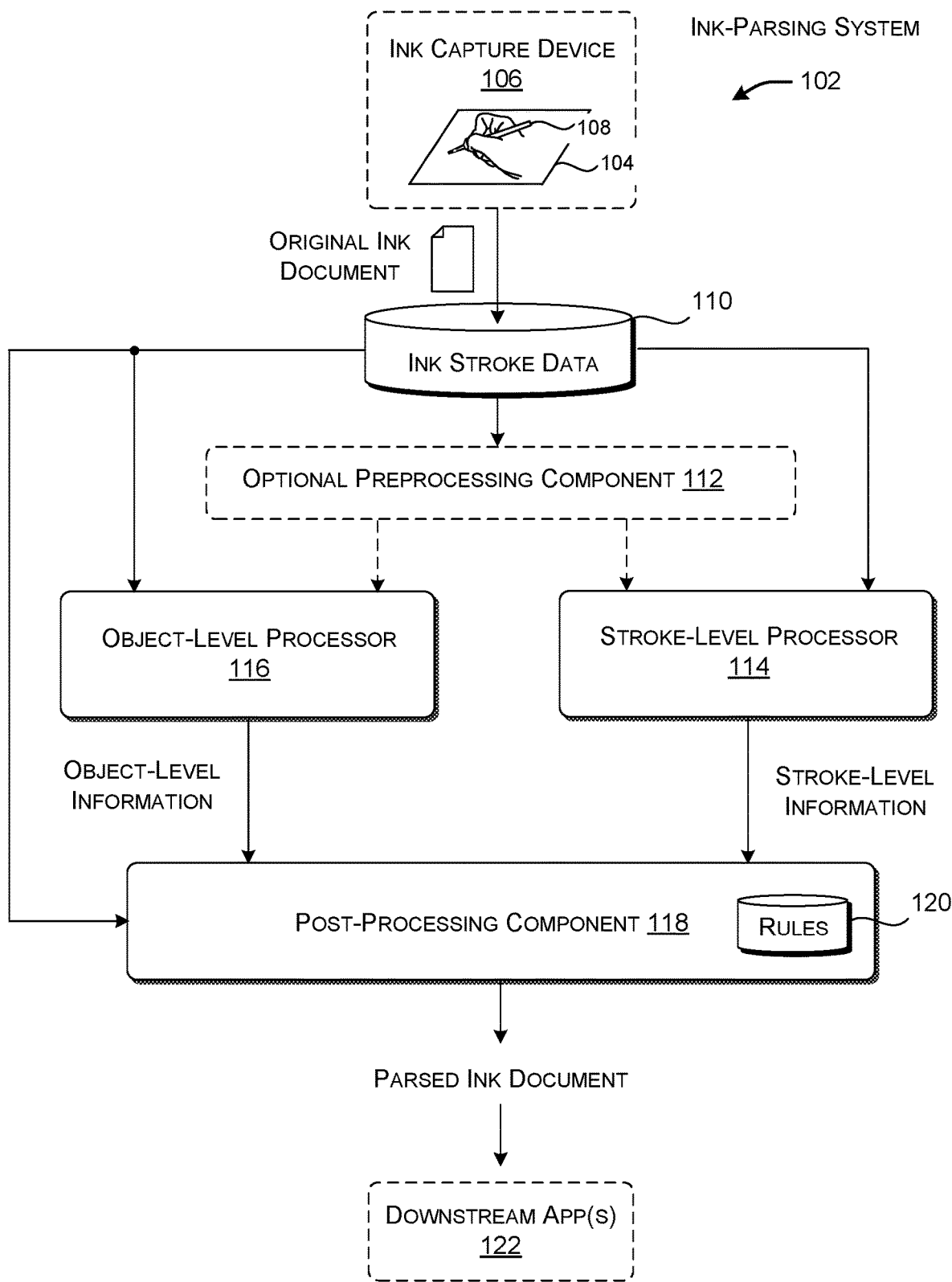
FIG. 1 shows an ink-parsing system for parsing a digital ink document. The ink-parsing system includes an object-level processor and a stroke-level processor.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes systems for processing digital ink documents. Section B sets forth illustrative methods which explain the operation of the systems of Section A. Section C describes illustrative computing functionality that can be used to implement any aspect of the features described in Sections A and B.

As a preliminary matter, the term "hardware logic circuitry" corresponds to technology that includes one or more hardware processors (e.g., CPUs, GPUs, etc.) that execute machine-readable instructions stored in a memory, and/or one or more reconfigurable gate units (e.g., FPGAs) that perform operations using a task-specific collection of fixed and/or programmable logic gates. Section C provides additional information regarding one implementation of the hardware logic circuitry. In some contexts, each of the terms "component," "module," "engine," "system," and "tool" refers to a part of the hardware logic circuitry that performs a particular function or combination of functions.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The following explanation may identify one or more features as "optional." This type of statement is not to be interpreted as an exhaustive indication of features that may be considered as optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further still, the descriptors "first," "second," "third," etc. are used to distinguish among different items, and do not imply an ordering among items, unless otherwise noted. Finally, the terms "exemplary" or "illustrative" refer to one implementation among potentially many implementations.

A. Illustrative Computing Systems

A.1. Overview of Systems

FIG. 1 shows an ink-parsing system 102 for detecting objects within an ink document and for classifying their respective types. Without limitation, illustrative types of objects in an ink document correspond to text paragraphs, lists, tables, charts, drawing objects, etc. In the terminology used herein, a digital ink stroke (or "ink stroke" for brevity) refers to a sequence of digital data points created by a user as the user moves a writing implement across a writing surface 104 of an ink capture device 106. The writing implement may correspond to a pen 108, a finger, or some other tool. That is, each ink stroke begins when the user applies the writing implement to the writing surface 104 (corresponding to a pen-down event). Each ink stroke ends when the user disengages the writing implement from the writing surface (corresponding to a pen-up event). In some implementations, a pen-down event corresponds to the case in which the user makes physical contact with the writing surface 104. In other cases, a pen-down event corresponds to the situation in which the user moves the writing implement within a prescribed distance to the writing surface 104, but does not necessarily make physical contact with the writing surface 104.

A digital ink document (or "ink document" for brevity) refers to a document that includes one or more ink strokes. In some cases, an ink document is entirely composed of ink strokes. In other cases, an ink document can combine ink strokes with other content items that are not produced using the ink capture device 106, such as text composed of typed characters (e.g., produced using a key input device or received from another source, etc.), images, etc.

In one implementation, the writing surface 104 includes a touch-sensitive display that uses a display device in combination with a digitizer. The display device may be co-extensive with the digitizer. Or the digitizer and the display device can overlap in part, but not in whole. In another implementation, the writing surface 104 corresponds to a digitizer that is separate from a display device. For example, the writing surface 104 may correspond to a digitizing pad that is physically separate from a display device on which the ink document is displayed. Still other implementations of the writing surface 104 are possible.

Without limitation, the display device can include a Liquid Crystal Display (LCD) device, an Organic Light-Emitting Diode (OLED) display device, an electronic paper display device (e.g., an electrophoretic display device, an electrowetting display device, etc.), a Cholesteric Liquid Crystal Display (ChLCD) device, a projection display device, and so on. The digitizer (not shown) detects the position of the pen 108 or other writing implement (such as a finger) on its surface. The digitizer can use any technology to perform this task. In some implementation, the digitizer includes an array of sensing elements arranged over its surface that detect the presence of the writing implement when placed in proximity thereto. More generally, the digitizer can us any technology or combination of technologies to detect the writing implement, including resistive, capacitive, electromagnetic, optical, and/or acoustic technology.

When it is used, the pen 108 may correspond to a passive pen (also known as a stylus) or an active digital pen. In some implementations, an active digital pen can perform various functions, such as transmitting electromagnetic signals that are detected by the digitizer's sensing elements when the pen is placed in proximity to the digitizer. In addition, or alternatively, the active digital pen can sense electrical signals that are transmitted by the digitizer. In addition, or alternatively, the active digital pen can sense the pressure with which the user applies the active pen to the writing surface 104. In addition, or alternatively, the active digital pen can transmit information that it collects to any destination device, such as the writing surface 104 itself.

In some implementations, a computing device incorporates the ink capture device 106 as an integral and physical part thereof. For example, the computing device may correspond to a smartphone that incorporates a touch-sensitive display device. Alternatively, a computing device is tethered to the ink capture device 106 via a cable, wireless connection, and/or any other communication mechanism. The computing device can also include components that implement the remainder of the ink-parsing system 102 shown in FIG. 1, and which are described below.

The ink capture device 106 can record various data items that describe each ink stroke. For example, the ink capture device 106 can capture any combination of the following data items: a) an indication of a start and stop of the ink stroke, corresponding to pen-down and pen-up events; b) a series of position measurements, each position measurement describing the position of the writing implement on the writing surface 104 (e.g., by specifying x and y coordinates), or the change in position of the writing implement from a last-detected position (e.g., by specifying $\Delta x$ and $\Delta y$ measurements); c) a series of optional pressure measurements, each pressure measurement describing a pressure with which the user applies the writing implement to the writing surface 104; d) a series of time measurements, each time measurement describing a time at which a particular data point was captured, or the span of time since a last data point was captured (e.g., by specifying a $\Delta t$ value), and so on. Note, however, that the ink-parsing system 102 is agnostic with respect to the particular ink stroke data captured by a particular manifestation of the ink capture device 106. In other words, the ink-parsing system 102 can work with any type of ink capture device 106 regardless of the way that the ink capture device 106 expresses ink strokes.

A data store 110 stores ink stroke data, which collectively refers to all of the ink strokes produced by the ink capture device 106 (optionally together with any non-ink content in the ink document). An optional preprocessing component 112 performs any type of preprocessing operations on the ink stroke data. For example, the preprocessing component 112 can include a renderer that converts the ink stroke data into an image, referred to as an ink image herein. That is, the ink image represents the ink strokes within an ink document using an array of pixels. Any given individual pixel in the ink image may depict no content, a part of a single ink stroke, a part of two or more intersecting ink strokes, other non-ink content in the ink document (if any), etc. Different implementations of the ink-parsing system 102 operate on different instances of input data. For example, some implementations can operate on only the original ink stroke data (meaning the ink stroke data prior to it being operated on the by the preprocessing component 112). Other implementations can operate on just the ink image. Still other implementations can operate on a combination of the original ink stroke data and the ink image, and so on.

From a high-level perspective, the ink-parsing system 102 parses an ink document by performing two modes of analysis: stroke-level analysis and object-level analysis. More specifically, a stroke-level processor 114 performs stroke-level processing on the plurality of ink strokes in the ink document, as represented by the original ink stroke data and/or the ink image. This operation yields stroke-level information that identifies at least one characteristic of each ink stroke that can be used to classify the type of the ink stroke, e.g., by determining whether the ink stroke is a drawing ink stroke or a text ink stroke. An object-level processor 116 performs object-level processing on the original ink stroke data and/or the ink image. This operation yields object-level information that identifies one more groupings of ink strokes in the ink documents. Each grouping of ink strokes corresponds to a candidate object, such as a drawing object, paragraph object, chart object, etc. A post-processing component 118 parses the ink document based on the stroke-level information and the object-level information. This post-processing operation yields a parsing result that identifies one or more different types of objects in the ink document. The post-processing component 118 can perform its operation as guided by one or more rules in a data store 120.

Subsections A.2 and A.3 set forth two respective implementations of the ink-parsing system 102. In the implementation of Subsection A.2, both the stroke-level processor 114 and the object-level processor 116 operate on the ink image. More specifically, in this implementation, the stroke-level processor 114 classifies individual pixels in the ink image that depict ink strokes. For example, the stroke-level processor 114 can indicate that a particular pixel likely belongs to a drawing ink stroke with a first level of confidence or a text ink stroke with a second level of confidence. The object-level processor 116 can identify bounding boxes associated with candidate objects in the ink image. In the implementation of Subsection A.3, the image-based stroke-level processor 114 can be replaced with a module that classifies each ink stroke based on data items (defined below) in the original ink stroke data.

In both implementations, one rule applied by the post-processing component 118 can attempt to determine whether a particular ink stroke belongs to a particular object under consideration. In this implementation, the post-processing component 118 includes a stroke post-processor (not shown in FIG. 1) that classifies a type of the particular ink stroke based on the stroke-level information received by the stroke-level processor 114. This yields a stroke-based classification, according to the terminology used herein. The post-processing component 118 also includes a block post-processor (not shown in FIG. 1) that classifies the type of the particular object under consideration based on the stroke-level information and/or the object-level information. This yields an object-based classification, according to the terminology used herein. The rule specifies that the particular ink stroke can be considered as part of the particular object when: (a) the particular ink stroke intersects a region associated with the particular object by at least a predetermined amount; and (b) the stroke-based classification is the same as the object-based classification.

One or more downstream applications ("apps") 122 can perform any application-specific functions based on the parsed document provided by the ink-parsing system 102. For instance, one down-stream application can format an object in a particular manner based on its classification, or govern the user's interaction with the object based on its classification, etc.

In conclusion to the explanation of FIG. 1, the ink-parsing system 102 provides accurate output results by synthesizing knowledge gained through two analysis paths: the stroke-based analysis path and the object-based analysis path. The ink-parsing system 102 is specifically helpful in parsing complexly-structured ink documents in which different kinds of objects run together, e.g., as when two bounding boxes having different classifications intersect with each other. It further does so without unduly complicating its model with a large number of complex ad hoc rules. As recognized by the inventors, such a large model might degrade the latency-related performance of the ink-parsing system 102 and increase its utilization of computing resources. Such ad hoc rules might also compromise the scalability of the ink-parsing system 102, e.g., by making it suitable for some ink-processing platforms but not others. The ink-parsing system 102 also provides a resource-efficient architecture because, in some implementations, the stroke-level processing path shares some operations with the object-level processing path. This is particularly true with respect to the implementation of the ink-parsing system set forth in the next section.

A.2. Image-Based Ink-Parsing System

Figure 2:
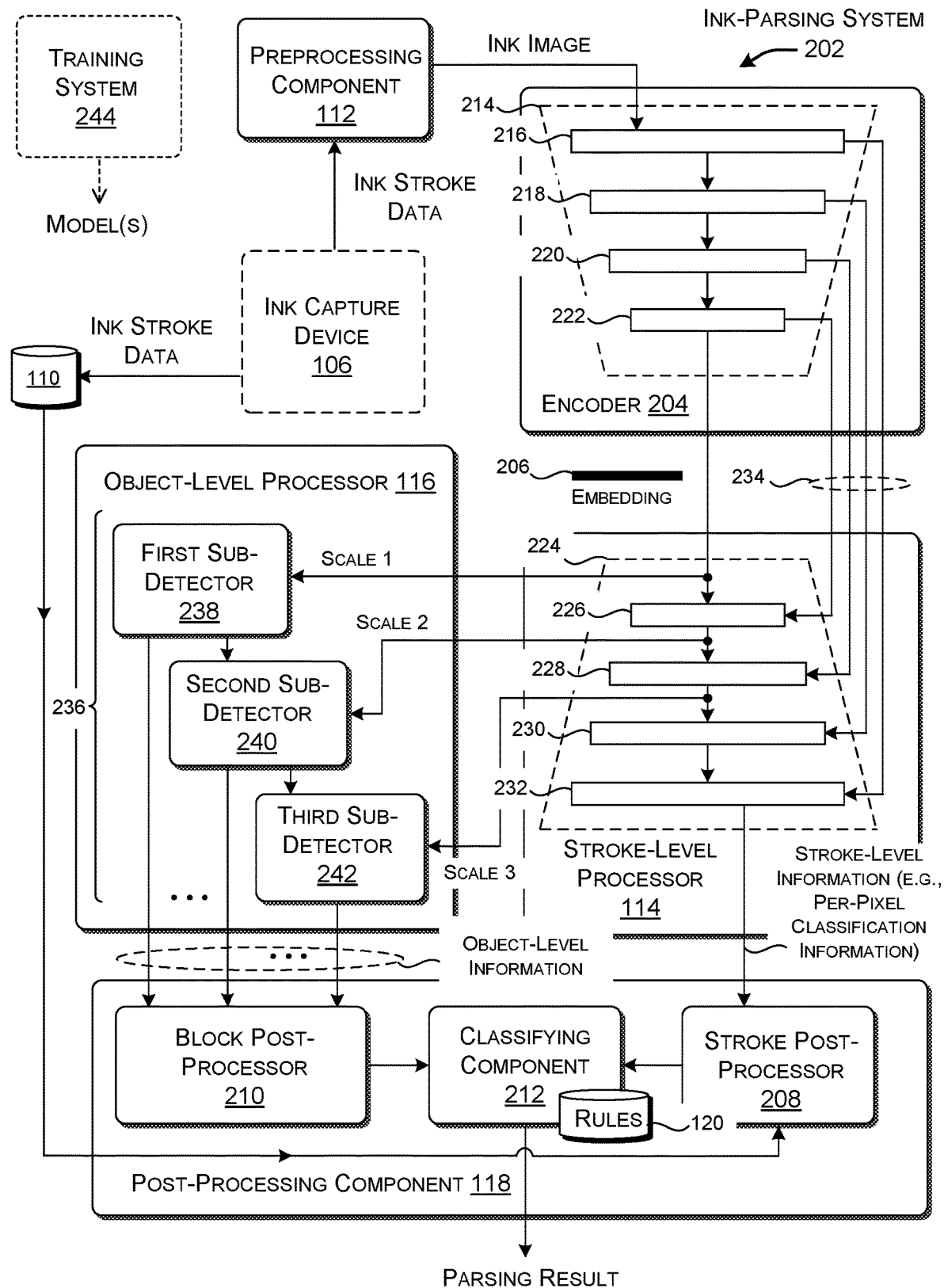
FIG. 2 shows an ink-parsing system that represents one particular manifestation of the ink-parsing system of FIG. 1.

FIG. 2 shows an ink-parsing system 202 that represents a first implementation of the ink-parsing system 102 shown in FIG. 1. In the ink-parsing system 202, the ink capture device 106 (described above) captures ink stroke data associated with an ink document. The ink-parsing system 202 stores the ink stroke data in the data store 110. The preprocessing component 112 uses an image renderer to convert the ink stroke data into an ink image. Both the stroke-level processor 114 and the object-level processor 116 operate on the ink image rather than the original ink stroke data. The post-processing component 118 parses the ink document based on the original ink stroke data, the stroke-level information provided by the stroke-level processor 114, and the object-level information provided by the object-level processor 116.

In one implementation, an encoder 204 maps the ink image into an image feature embedding 206. The image feature embedding 206 expresses the characteristics or features of the ink image. For example, the encoder 204 may correspond to a neural network encoder that produces a vector that provides a distributed representation of the semantics of the ink image within a low-dimensional semantic space. The stroke-level processor 114 includes a pixel classifier (described below) that performs pixel-based classification on the image feature embedding 206, to produce the stroke-level information, in which each pixel of the ink image is assigned a classification.

The object-level processor 116 performs object-based classification on the image feature embedding 206 and/or on image information that derives from the image feature embedding 206, to produce object-level information. The object-level processor 116 performs its task by identifying bounding boxes that are likely to contain objects. In some implementations, but not all implementations, the object-level processor 116 may also optionally assign respective classifications to the bounding boxes. A classification of each bounding box identifies the type of object that is likely enclosed by the bounding box.

The post-processing component 118 can include a stroke post-processor 208 for performing post-processing on the stroke-level information and the original ink stroke data. The stroke-post-processor 208 makes reference to the original ink stroke data because this data identifies what parts of the ink image correspond to discrete ink strokes. The post-processing component 118 also include a block post-processor 210 for performing post-processing on the object-level information. A classifying component 212 parses the ink document based on output results provided by the stroke post-processor 208 and the block post-processor 210, with reference to one or more rules in a data store 120.

Each of the above system components will be explained in greater detail below. Beginning with the encoder 204, in one implementation, this component can be implemented by a neural network 214 having plural down-sampling stages implemented by a pipeline of respective convolutional blocks (216, 218, 220, 222). The first convolutional block 216 receives the ink image as input. The last convolutional block 222 outputs the image feature embedding 206. Each intermediary convolutional block receives its input data from a preceding convolutional block in the pipeline. Although four convolutional blocks (216, . . . , 222) are shown, the encoder 204 can include any number of convolutional blocks (or any other processing units), including fewer than four convolutional blocks or more than four convolutional blocks.

Each convolutional block includes at least one convolutional layer that applies a convolution operation. In some implementations, a convolutional layer moves an n×m kernel across an input image (where the term "input image" in this general context refers to whatever image is fed to the convolutional layer). In some implementations, at each position of the kernel, the convolutional layer generates the dot product of the kernel values with the underlying pixel values of the input image. Each convolutional block may achieve its down-sampling function by virtue of the stride it uses to perform its convolutional operation (such as by choosing a stride of 2) and/or through the use of at least one pooling layer. A pooling layer moves a window of predetermined size across an input image (where, again, the input image corresponds to whatever image is fed to the pooling layer). The pooling layer then performs some kind of aggregating/summarizing operation with respect to the values of the input image enclosed by the window, such as by identifying and storing the maximum value in the window, generating and storing the average of the values in the window, etc. Each convolutional block can also include other environment-specific mechanisms, such as any of: one or more activation layers that apply activation functions (such as an ReLU function); one or more fully-connected layers; one or more residual connections, one or more classification layers, etc. A residual connection copies input data that is fed to a processing layer (or layers) and adds that input data to output data generated by the processing layer(s).

The stroke-level processor 114 can include a pixel classifier neural network 224 ("pixel classifier" for brevity) that includes a plurality of up-sampling stages implemented by plural respective deconvolutional blocks (226, 228, 230, 232). Again, FIG. 1 shows four deconvolutional blocks (226, 228, 230, 232), but the pixel classifier 224 can include any number of deconvolutional blocks. Each deconvolutional block can include any of the above-described layers of a convolutional block; but the net result of a deconvolutional block is to increase the size of an input image fed to it. A deconvolutional block can perform its upsampling function by selecting an appropriate stride of its convolutional operation(s) and/or by a separate up-sampling layer. One kind of up-sampling layer produces an output image by duplicating data values in an input image.

In some implementations, each deconvolutional block also combines its input image with image information received from a counterpart convolutional block in the encoder 204. This operation may be performed by copying the image information from the appropriate block of the counterpart convolutional block and concatenating it with the input image that is fed to the deconvolutional block. FIG. 1 illustrates this operation as a series of connections 234. These types of connections are sometimes referred to in the industry as "U-Net" connections.

The pixel classifier 224 is specifically trained to provide an output image that reconstructs the ink image based on the image feature embedding 116 that is fed to the pixel classifier 224. In this sense, the pixel classifier 224 can be viewed as a decoder that complements the encoder 204. In addition, the pixel classifier 224 yields information that provides a classification for each pixel in the output image. For instance, for a single given pixel in the output image, the pixel classifier 224 can indicate that it likely corresponds to a drawing object with a first confidence level, and may correspond to a paragraph with a second confidence level that is lower than the first confidence level, etc. The output of the pixel classifier 224 is stroke-level information, and, more specifically, stroke-based classification information.

In one implementation, the object-level processor 116 can detect bounding boxes in image information at different scales using an object-detector neural network 236 ("object detector" for brevity). For instance, a first sub-detector 238 can operate on image information that is input to the first deconvolutional block 226 of the pixel classifier 224. Note that this image information is the same as the image feature embedding 206 fed to the pixel classifier 224. A second sub-detector 240 can operate on image information that is fed to the second deconvolutional block 228 of the pixel classifier 224. A third sub-detector 242 can operate on image information that is fed to the third convolutional block 228 of the pixel classifier 224. The use of three sub-detectors (238, 240, 242) is merely illustrative; in other implementations, the object-level processor 116 can use less than three sub-detectors (including, in some implementations, a single sub-detector), or can use more than three sub-detectors. The second sub-detector 240 can also receive input information provided by any stage of the first sub-detector 238, and the third sub-detector 242 can receive input information provided by any stage of the second sub-detector 240, etc.

The illustrative operation of the object-level processor 116 will be explained below in greater detail. Consider a representative sub-detector, such as the first sub-detector 238. The sub-detector 238 can examine a plurality of candidate bounding boxes in the image information that is fed to it. For each candidate bounding box, the sub-detector 238 determines whether the candidate bounding box includes an object. In some implementations, the sub-detector 238 ends its analysis at this juncture without attempting to classify the type of object enclosed in the candidate bounding box. In other implementations, the sub-detector 238 also determines the most likely classification of the object enclosed by the candidate bounding box. In some implementations, the object detector 236 can include any combination of the types of layers described above, such as one more convolutional layers, one or more pooling layers, one or more activation layers, etc.

The block post-processor 210 consolidates the candidate bounding boxes identified by the object-level processor 116 into a final set of bounding boxes. As will be explained in greater detail below, the block post-processor 210 performs its task, in part, using the non-maximum suppression algorithm. The block post-processor 210 can also optionally classify the objects associated with the remaining candidate bounding boxes, if the bounding boxes are not already tagged with classifications by the object-level processor 116. This yields an object-based classification. The stroke post-processor 208 determines the classification of each stroke in the ink document based on the stroke-level information classification information (as explained in greater detailed below), to yield a stroke-based classification.

In some implementations, the classifying component 212 parses the ink document by assigning each ink stroke in the ink document to a particular object, if any. This assignment identifies two properties of a particular ink stroke under consideration: its final classification; and its affiliation with a particular object (if any). For instance, in processing a particular stroke, the classifying component 212 may decide that this ink stroke is a drawing ink stroke. It may also determine that this drawing ink stroke is a member of a particular grouping of ink strokes identified by the object-level processor 116.

According to one default rule, the classifying component 212 assigns a final classification to a particular ink stroke based on its stroke-based classification assigned by the stroke post-processor 208. In some cases, the particular ink stroke intersects a particular bounding box. The classifying component 212 will classify the particular ink stroke using its stroke-based classification regardless of whether the bounding box has an object-based classification that is the same as or different than the stroke-based classification. In addition, the classifying component 212 will consider the particular ink stroke as a member of a particular object enclosed by the bounding box if the particular ink stroke intersects with the bounding box by at least a prescribed amount, and if its stroke-based classification agrees with the particular object's object-based classification.

The above rules are particularly helpful in resolving the classification of an ink stroke that lies within an intersection of two objects having different classifications. Here, the classifying component 212 will use the stroke-level classification of the ink stroke to break the tie between whether to consider the ink stroke as belonging to the first object or the second object. The examples of FIGS. 3 and 4, explained below, will clarify the operation of the classifying component 212.

A training system 244 produces one or more models that govern the operation of at least the encoder 204, pixel classifier 224, and object-level processor 116. The training system 244 can perform this task by iteratively processing a set of training examples. Each positive training example can include an input image that has been tagged with correct classifications of objects contained therein. In one implementation, each negative training example includes an input image that has been tagged with no classifications because it contains no objects. The training system 244 can perform its iterative training with the objective of minimizing or maximizing a loss function. The loss function describes the net loss of the ink-parsing system 202 as a whole, which measures an extent to which the ink-parsing system 202 classifies a training example correctly or incorrectly (based on the known classification of the training example, if any). The loss function associated with the ink-parsing system 202 expresses, as part thereof, at least the loss exhibited by the pixel classifier 224 and loss exhibited by the object-level processor 116. The training system 244 can apply any training technique to generate its model(s), such as stochastic gradient descent, with or without drop-out.

Figure 3:
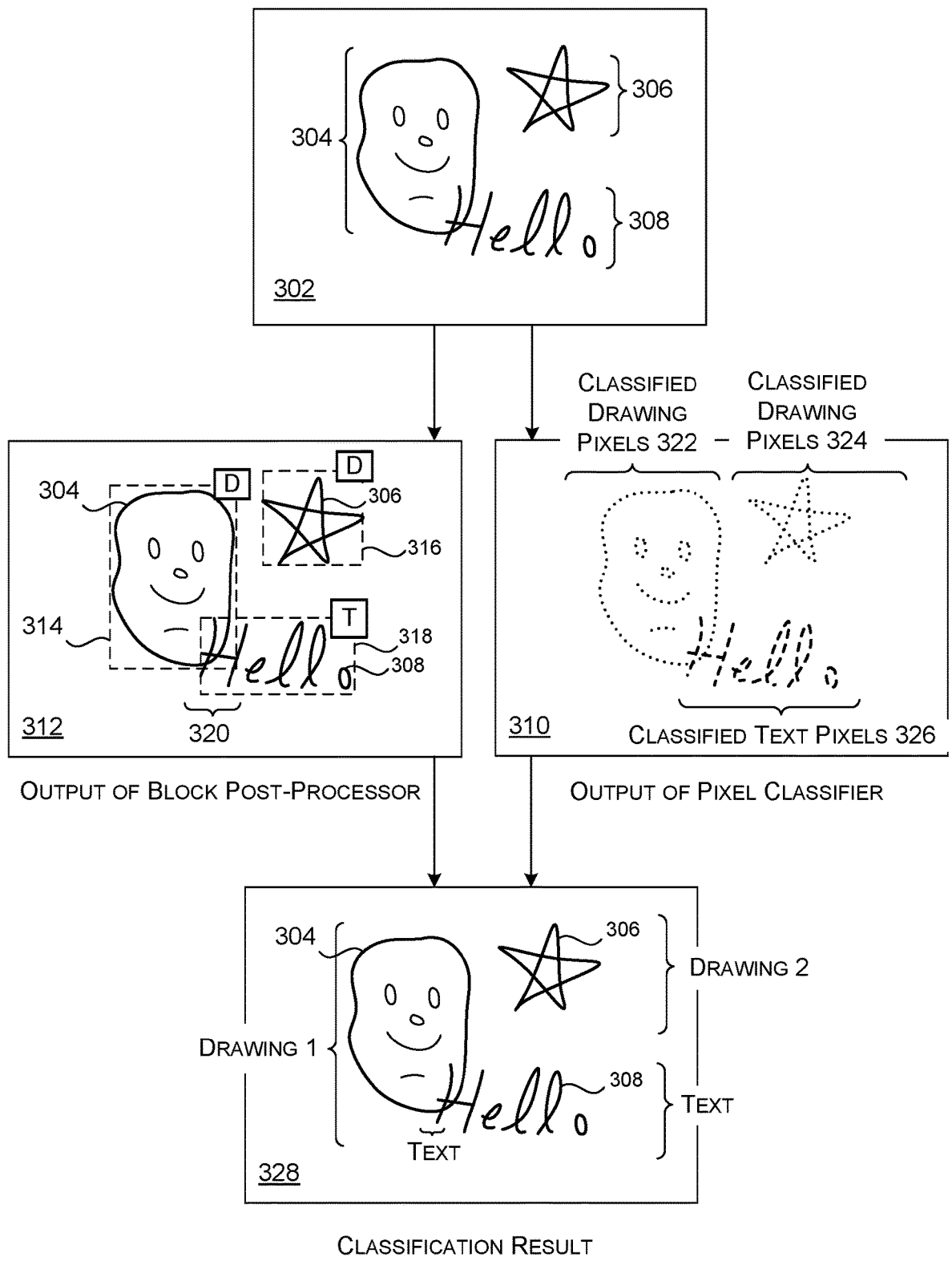
FIG. 3 shows one example of the operation of the ink-parsing system of FIG. 2.

FIG. 3 shows a first example of the operation of the ink-parsing system 202. Assume that, at the time of classification, the user has created an ink document 302 that includes the following distinct objects: a first drawing object 304 that depicts a smiley face; a second drawing object 306 that depicts a star; and a text object 308 that includes the word "Hello." Note that these parsing results reflect a coarse level of object classification. Other implementations can use more fine-grained classification categories, such as by identifying the particular type of text object associated with the word "Hello," such as a paragraph text object, a list text object, etc.

The preprocessing component 112 renders this ink document 302 into an ink image, and the encoder 204 maps the ink image into an image feature embedding 206. The pixel classifier 224 then maps the image feature embedding 206 into stroke-level information 310, while the object-level processor 116 in conjunction with the block post-processor 210 maps the image feature embedding 206 into processed object-based classification information 312.

The processed object-based classification information 312 identifies a first bounding box 314 that includes the first drawing object 304, a second bounding box 316 that contains the second object, and a third bounding box 318 that contains the text object 308. Ink strokes in a bounding box are considered, as an initial premise, to share the classification of its bounding box. Note that the first bounding box 314 at least partially intersects the third bounding box 318, and that these two bounding boxes (314, 318) have different classifications (drawing and text, respectively). This raises the question of how ink strokes in the intersection of these boxes (314, 318) should be interpreted. For example, consider the left-most ink stroke of the letter "H" 320 in the text object 308. The entirety of this ink stroke is encompassed by the third bounding box 318, and is mostly encompassed by the first bounding box 314.

In some implementations, the object-level processor 116 determines the classifications of its candidate bounding boxes. In other implementations, the object-level processor 116 only identifies bounding boxes that are likely to contain objects, without attempting to classify the types of those objects. As will be described below, in the latter case, the block post-processor 210 can determine the classification of each bounding box based on other evidence, e.g., based on the stroke-based classifications of ink strokes within the bounding box.

The stroke-level classification information 310 assigns stroke-based classifications to each pixel that makes up an ink stroke in the ink image. Assume, for instance, that the pixel classifier 224 classifies all or most of the pixels in the first drawing object 304 as drawing pixels, as reflected by classified drawing pixels 322. Assume that the pixel classifier 224 classifies all or most of the pixels in the second drawing object 306 as drawing pixels, as reflected by classified drawing pixels 324. And assume that the pixel classifier 224 classifies all or most of the pixels in the text object 308 as text pixels, as reflected by classified text pixels 326. Based on these individual pixel classifications, the stroke post-processor 208 assigns a stroke-based classification to each ink stroke. More specifically, assume that the stroke post-processor 208 indicates that each ink stroke that makes up the drawing objects (304, 306) has a drawing stroke-based classification, while each ink stroke that makes up the text objet 308 has a text stroke-based classification. Note that this kind of uniform result is not assured, however, due to ambiguity in interpreting ink strokes based on the stroke-based classification information. For example, an individual pixel may represent the intersection of two kinds of ink strokes (e.g., a drawing ink stroke and a text ink stroke). This may result in the pixel classifier 224 assigning a low confidence score to its classification of the individual pixel. An ink stroke as a whole may have plural pixels having low confidence scores. This finding may result in the stroke post-processor 208 giving the classification of the ink stroke as a whole a low confidence score.

The bottom pane 328 of FIG. 2 illustrates the final classification results provided by the classifying component 212. The classifying component 212 correctly identifies the first drawing object 304 as a first drawing, the second drawing object 306 as a second drawing distinct from the first drawing, and the text object 308 as a piece of text.

As described above, the classifying component 212 can apply a number of rules in parsing the ink document 302. The parsing will resolve two issues with respect to a particular ink stroke under consideration: the classification of the individual ink stroke, and its affiliation with a particular object, if any. In one implementation, a default rule specifies that the classifying component 212 will classify the ink stroke based on its stroke-based classification, if this classification is known (meaning that the stroke-based confidence level determined by the stroke post-processor 208 satisfies an environment-specific confidence level). Consider, for instance, the case of the left-most ink stroke of the letter H 320. The classifying component 212 will conclude that this ink stroke intersects both the first bounding box 314 and the third bounding box 318 by more than a prescribed amount, potentially making it a member of two bounding boxes and the objects associated therewith. Per the default rule, the classifying component 212 will assign the left-most ink stroke to a text classification because that is its stroke-based classification. Further, the classifying component 212 will consider the left-most ink stroke as part of the text object 308 because: a) the ink stroke intersects the bounding box 318 of the text object 308 by at least a prescribed amount; and b) the stroke-based classification of the ink stroke agrees with the object-based classification of the bounding box 318.

The classifying component 212 can apply other rules in other situations. In another case, assume that the classifying component 212 concludes that a particular ink stroke has a known object-based classification and an unknown stroke-based classification. Or assume that the classifying component 212 concludes that the particular ink stroke has an unknown object-based classification and a known stroke-based classification. Again, a known classification is a classification that satisfies a prescribed threshold value; an unknown classification is an outcome that occurs when no classification satisfies this level. The classifying component 212 can apply whatever classification is known to the particular ink stroke in question.

In another case, the classification component 212 can assign a classification to each particular ink stroke based on a consideration of both its object-based classification and stroke-based classification. For example, when the classification component 212 encounters a conflict between the object-based classification and stroke-based classification for a particular ink stroke, it can choose a classification for the ink stroke based on the confidence levels of these two classifications, e.g., by classifying the ink stroke based on the object-based classification if this classification exceeds the confidence level of the stroke-based classification by at least a prescribed amount.

Still other classification rules can take into consideration additional evidence in making a final classification for an ink stroke under consideration. For example, another rule can take into consideration global information that describes the prevalence of difference types of objects within an image. For example, a classification rule may be less likely to classify a particular ink stroke as a text ink stroke if the drawing as a whole includes a relatively small number of other text ink strokes.

In some cases, the classifying component 212 implements its rules as discrete IF-THEN-type rules and/or other type(s) of handcrafted rules. Alternatively, or in addition, the classifying component 212 can implement its rules using a machine-trained model which inherently embodies its rules in its machine-learned parameter values.

FIG. 4 shows another ink document 402 processed by the ink-parsing system 202. In this case, the ink document 402 again includes three distinct objects: a first drawing object (A) 404; a list object 406 that is entirely enclosed in the first drawing object 404; and a second drawing object (B) 408 that only partially intersects the first drawing object 404. The ink-parsing system 202 correctly discriminates among these three objects (404, 406, 408) using the same processing flow described above. For instance, the classifying component 212 will conclude that each ink stroke in the list object 406 is fully enclosed by both the list object 406 and the first drawing object 404. The classifying component 212 will assign each such ink stroke to the list classification, however, because the ink stroke has a stroke-based classification that indicates that it is a list ink stroke, not a drawing ink stroke. The classifying component 212 will furthermore treat each ink stroke in the list object 406 as part of the list object 406 because it intersects the list object's bounding box by more than a prescribed amount, and it has a same classification as the box's object-based classification.

Note that an ink stroke in an area that overlaps the first drawing object 404 and the second drawing object 408 is classified as a drawing ink stroke regardless of whether it is considered a member of the first drawing object 404 or the second drawing object 408. In some implementations, the classifying component 212 can additionally consult other evidence to determine whether the ink stroke in question belongs to first drawing object 404 or the second drawing object 408. For example, the classifying component 212 can consult another analysis component (not shown) to determine whether the first drawing object 404 overlaps the second drawing object 408, or vice versa. If the former is true, the classifying component 212 concludes that the ink stroke likely belongs to the first drawing object 404. If the latter is true, the classifying component 212 concludes that the ink stroke likely belong to the second drawing object 408. Alternatively, or in addition, the classifying component 212 can consult a machine-trained model that classifies the stroke-to-object affiliation of the ink stroke in question. The machine-trained model can operate based on feature information that describes various characteristics regarding the ink stroke under consideration and its surrounding context.

Finally, FIG. 4 shows the case in which the ink document 402 includes a stray ink stroke 410 that does not lie within any of the above-identified objects (404, 406, 408). Assume that the stroke post-processor 208 interprets this ink stroke 410 as a text ink stroke, but the object-level processor 116 and the block post-processor 210 do not recognize this ink stroke 410 as an object to be classified (e.g., because it is too small, or based on any other environment-specific consideration), making the object-based classification of this ink stroke 410 unknown. In one implementation, the classifying component 212 can interpret this ink stroke 410 as a text object because there is no other evidence to refute this classification. The classifying component 212 may further fail to identify the ink stroke 410 as a member of any encompassing object, since it does not intersect any object's bounding box by more than a prescribed amount.

Assume that the same set of facts applies to another ink stroke 412: that is, the stroke post-processor 208 classifies this ink stroke as text, but the object-level processor 116 and the block post-processor 210 fail to recognize it as a distinct object (making its object-based classification unknown). In one implementation, the classifying component 212 can again interpret the ink stroke 412 as a text ink stroke. Further, the classifying component 212 will not consider the ink stroke 412 as a part of the drawing object 404 because it does not share the same object-based classification as the drawing object 404.

In yet other cases, an ink stroke has a known object-based classification, but an unknown stroke-based classification. The classifying component 212 will assign the ink stroke under consideration to its object-based classification because there is no other evidence to refute this classification. By definition, the ink stroke will also be considered a member of whatever object to which the object-based classification attaches.

FIG. 5 shows one technique by which the object-level processor 116 and block post-processor 210 can cooperate to identify candidate bounding boxes. In one implementation, the object-level processor 116 separately performs bounding box analysis on image information having different respective scales. For example, the first sub-detector 238 performs analysis on image information 502 provided at the output of the encoder 204. The second sub-detector 240 performs analysis on image information 504 provided at the output of the first deconvolutional block 226. And the third sub-detector 242 performs analysis on image information 406 provided at the output of the second deconvolutional block 228. These instances of image information (502, 504, 506) have progressively increasing scales. More generally, the object-level processor 116 can provide analysis for any number of scales, including a single scale.

Without limitation, each sub-detector can perform its bounding box analysis by dividing its input image information into plural cells. Consider, for instance, the representative third sub-detector 242 that receives image information 506. The sub-detector 242 divides the image information 506 into a grid of cells, including a representative cell 508. The sub-detector 242 next generates a plurality of candidate bounding boxes for each cell. In one non-limiting implementation, the sub-detector 242 defines a candidate box with reference to each of a set of possible anchor boxes. For example, FIG. 6 shows three anchor boxes in relation to the cell 508 having different aspect ratios, including a representative anchor box 602. The sub-detector 242 defines a candidate box with reference the anchor box 602 (for example) by specifying: a displacement of the anchor box 602 from a default position within the cell 508; a likelihood that the identified candidate box includes an object; and, in some cases, the likely type of object that is included in the identified candidate bounding box, etc. In other implementations, the sub-detector 242 does not classify the object in the bounding box; rather, the sub-detector 242 only provides a finding that the bounding box likely includes some type of object.

A box filter 510 within the block post-processor 210 uses the non-maximum suppression algorithm to reduce a large number of candidate bounding boxes to a much smaller final number of bounding boxes. A non-maximum suppression algorithm performs this task by iteratively selecting a bounding box having a highest confidence level (a "high-confidence bounding box"), identifying a subset of other bounding boxes which intersect with this high-confidence bounding box by at least a prescribed amount, and removing any intersecting bounding box that has a confidence level lower than the high-confidence bounding box. The box filter 510 can also retain only those bounding boxes having confidence levels above a prescribed threshold value.

An optional box-classifying component 512 can classify the objects within the remaining candidate boxes based on any evidence available to the ink-parsing system 202. The ink-parsing system 202 invokes the box-classifying component 512 when the object-level information provided by the object-level processor 116 does not already tag its candidate boxes with classification information. In one implementation, the box-classifying component 512 can compute a histogram for each candidate box that identifies how many ink strokes share a first stroke-based classification (given by the stroke-level processor 114), how many ink strokes share a second classification, and so on. The box-classifying component 512 can assign the candidate box to an object-based classification that receives the greatest number of "votes" in the histogram. The box-classifying component 512 can also provide a level of confidence associated with its predictions. The box-classifying component 512 can identify a candidate box's classification as unknown if no classification has a confidence level above a prescribed threshold value.

An optional box-adjusting component 514 adjusts the width of each surviving bounding box by a first prescribed amount, and adjusts the height of each surviving bounding box by a second prescribed amount. This adjustment operation reduces errors in determining the association between an ink stroke under consideration and a particular bounding box.

Other implementations of the object-level processor 116 can use other techniques for detecting objects in images. Background information on the general subject of object detection includes: Ren, et al., "Faster R-CNN: Towards Real-Time Object Detection with Region Proposal Networks, arXiv:1506.01497v3 [cs.CV], Jan. 6, 2016, 14 pages; and Liu, et al., "SSD: Single Shot MultiBox Detector," arXiv:1512.02325v5 [cs.CV], Dec. 29, 2016, 17 pages. Any such technique can be adapted for use in the object-level processor 116 of FIG. 1.

Figure 7:
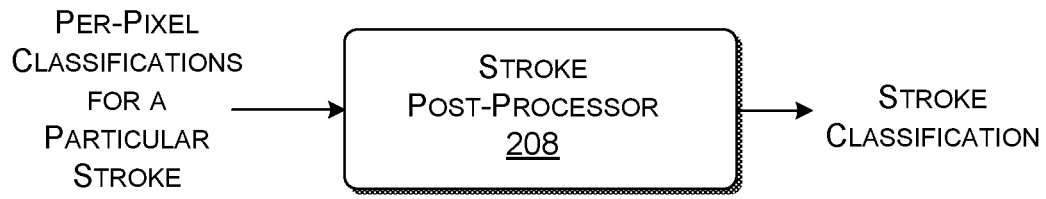
FIG. 7 shows a stroke post-processor that can be used to classify ink strokes in the ink-parsing systems of FIGS. 1 and 2 based on stroke-based classification information provided by the stroke-level processor.

FIG. 7 shows one implementation of the stroke post-processor 208. In one implementation, the stroke post-processor 208 processes a particular ink stroke by performing some type of statistical analysis on the classifications of the individual pixels that compose the ink stroke. For example, the stroke post-processor 208 can compute a histogram for each ink stroke that identifies how many pixels in the ink stroke share a first classification, how many pixels share a second classification, and so on. The stroke post-processor 208 can assign the ink stroke to the classification that receives the greatest number of "votes" in the histogram. The stroke post-processor 208 can also provide a level of confidence associated with its predictions. The stroke post-processor 208 can identify a stroke-based classification as unknown if no classification has a confidence level above a prescribed threshold value.

The above implementation of the stroke post-processor 208 is presented merely in the spirit of illustration, not limitation. For example, the stroke post-processor 208 can alternatively form a weighted sum of votes for a particular classification, where each pixel's vote is modified by a weighting factor that expresses its confidence level given by the pixel classifier 224.

A.3. Illustrative System Variations

The ink-parsing system 202 described in Subsection A.2 can be modified in different ways. According to one variation, the stroke-level processor 114 can operate directly on the original ink stroke data, rather than, or in addition to, the image-feature embedding 206 produced by the encoder 204 based on the ink image. The original ink stroke data provides a series data items that describe each ink stoke. For example, the original ink stroke data provides a series of captured position readings that describe the positions traversed by the user in drawing the ink stroke. In one implementation, the stroke-level processor 114 can use any type of machine-trained model and/or rules-based system to classify each data item based on the individual data item itself and the sequence of data items in which it appears. For instance, the stroke-level processor 114 can use any type of Hidden Markov Model (HMM), Conditional Random Fields (CRF) model, Recurrent Neural Network (RNN), etc. to classify each data item within a sequence of data items. In addition, or alternatively, the stroke-level processor 114 can use any type of machine-trained model and/or rules-based system to classify the ink stroke as a whole. For instance, the stroke-level processor 114 can use any type of neural network (such as a CNN, transformer-based neural network, etc.) to map the ink stroke data pertaining to an ink stroke to a classification for the ink stroke.

The object-level processor 116 can operate directly on the ink image itself, eliminating the use of the encoder 204 entirely. Alternatively, the object-level processor 116 can operate on different scaled versions of the ink image.

Alternatively, the object-level processor 116 can operate on the image feature embedding 206. Alternatively, the object-level processor 116 can operate on different up-scaled versions of the image feature embedding 206, and so on.

B. Illustrative Processes

Figure 8:
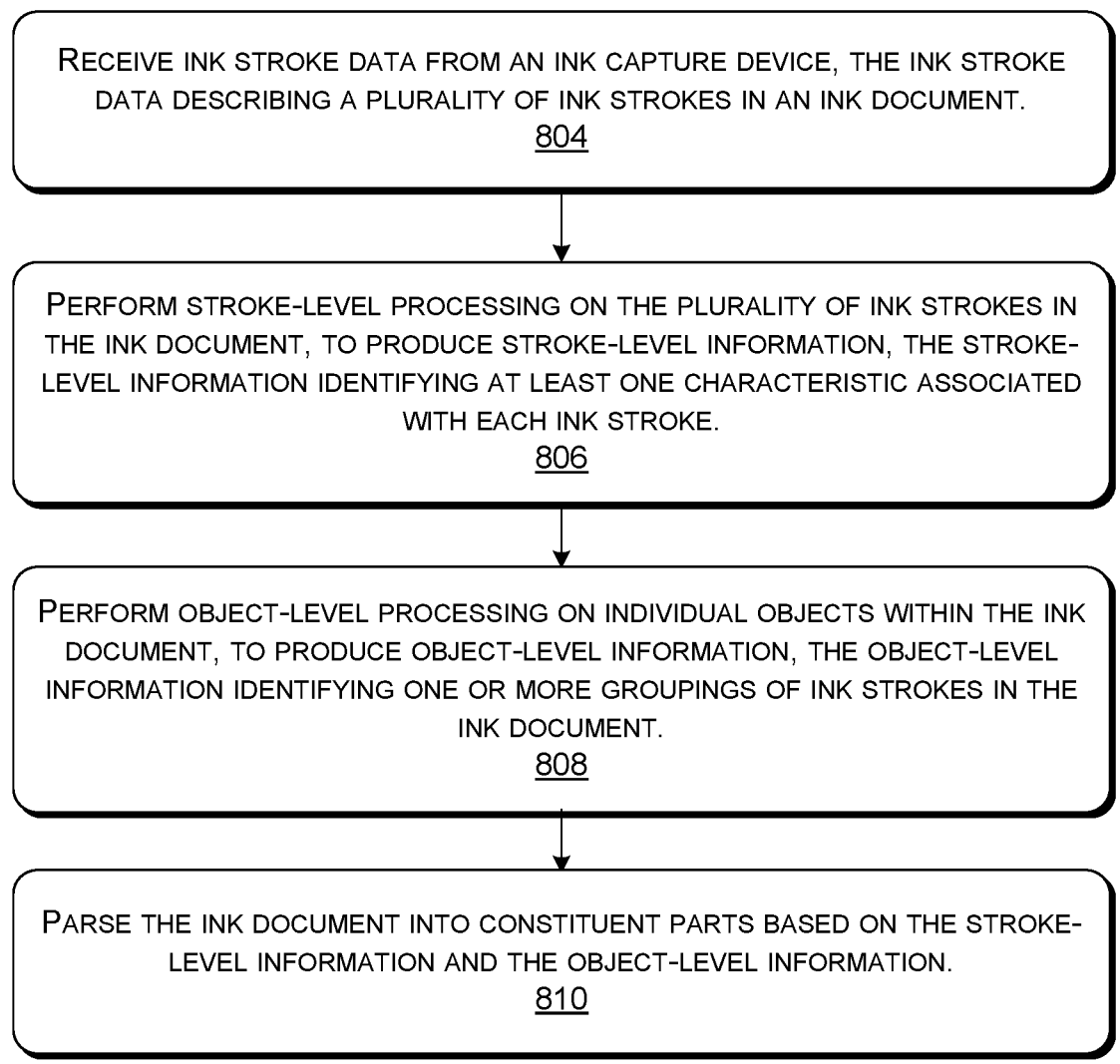
FIGS. 8 and 9 are two flowcharts that provide overviews of the operation of the ink-parsing system of FIGS. 1 and 2, respectively.
Figure 9:
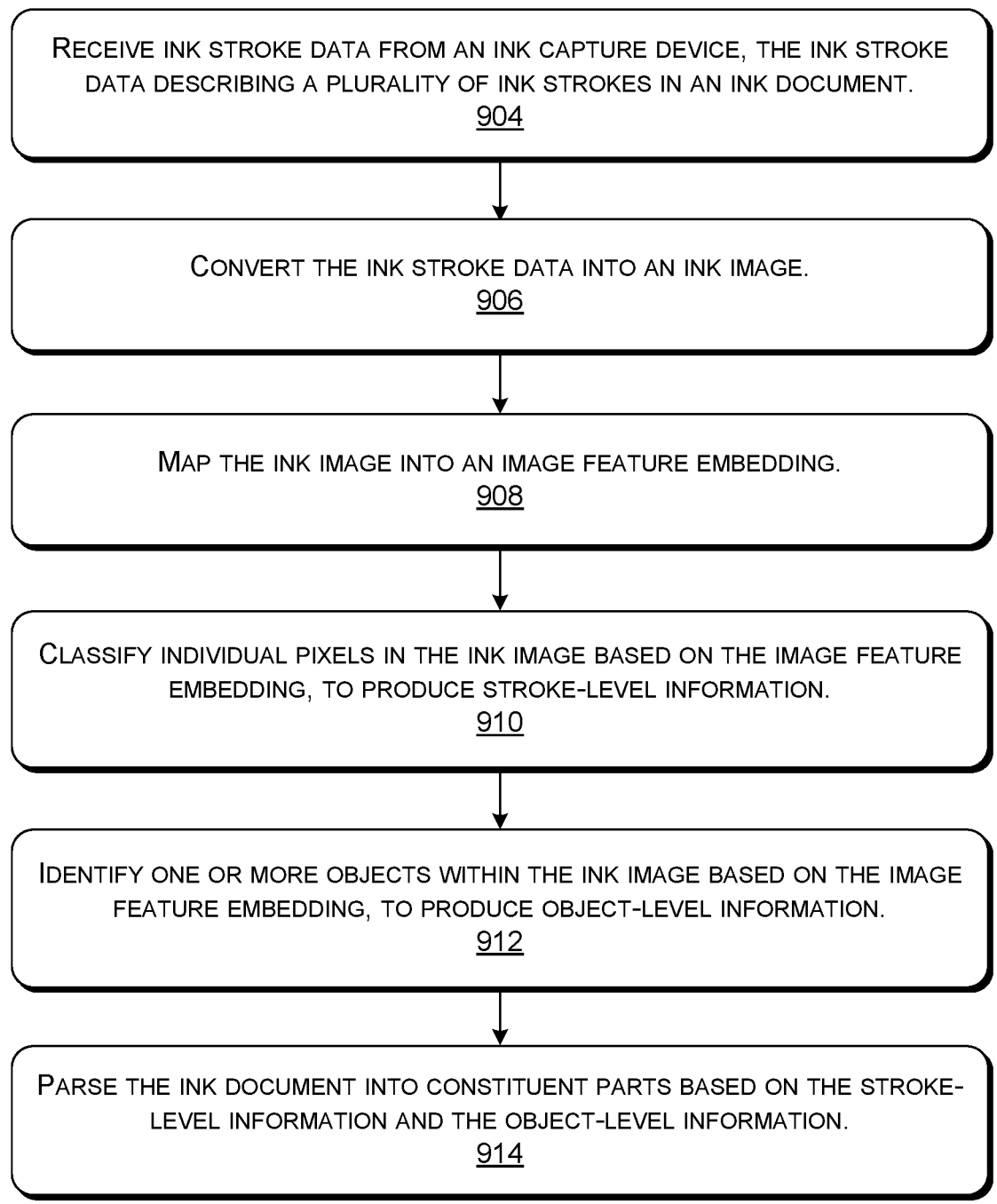

FIGS. 8-10 show processes that explain the operation of the ink-parsing system 102 of Section A in flowchart form. Since the principles underlying the operation of the ink-parsing system 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 8 shows a process 802 that describes a first implementation of the ink-parsing system 102 of FIG. 1. In block 804, the ink-parsing system 102 receives ink stroke data from an ink capture device 106, the ink stroke data describing a plurality of ink strokes in an ink document. In block 806, the ink-parsing system 102 performs stroke-level processing on the plurality of ink strokes in the ink document, to produce stroke-level information, the stroke-level information identifying at least one characteristic associated with each ink stroke. In block 808, the ink-parsing system 102 performs object-level processing on individual objects within the ink document, to produce object-level information, the object-level information identifying one or more groupings of ink strokes in the ink document. In block 810, the ink-parsing system 102 parses the ink document into constituent parts based on the stroke-level information and the object-level information.

FIG. 9 shows a process 902 that represents a particular manifestation of the process 802 of FIG. 8, e.g., corresponding to the implementation shown in FIG. 2. In block 904, the ink-parsing system 102 receives ink stroke data from the ink capture device 106, the ink stroke data describing a plurality of ink strokes in an ink document. In block 906, the ink-parsing system 102 converts the ink stroke data into an ink image. In block 908, the ink-parsing system 102 maps the ink image into an image feature embedding. In block 910, the ink-parsing system 102 classifies individual pixels in the ink image based on the image feature embedding, to produce stroke-level information. In block 912, the ink-parsing system 102 identifies one or more objects within the ink image based on the image feature embedding, to produce object-level information. In block 914, the ink-parsing system 102 parses the ink document into constituent parts based on the stroke-level information and the object-level information.

FIG. 10 shows a process 1002 that describes one rule applied by the ink-parsing system 102 of FIG. 1. In block 1004, the ink-parsing system 102 determines a stroke-based classification associated with a particular ink stroke based on the stroke-level information. In block 1006, the ink-parsing system 102 determines an object-based classification associated with a particular object, the particular object being associated with a region in the ink image, and being associated with a particular grouping of ink strokes. In block 1008, the ink-parsing system 102 determines whether the particular ink stroke intersects the region associated with the particular object. In block 1008, the ink-parsing system 102 determines whether the particular ink stroke is a member of the particular object based on a rule that specifies that: (1) the particular ink stroke is a member of the particular object when the particular ink stroke intersects the region by at least a prescribed amount, and the particular ink stroke and the particular object have a same classification; and (2) the particular ink stroke is not a member of the particular object when the particular ink stroke and the particular object do not have a same classification.

C. Representative Computing Functionality

FIG. 11 shows an example of computing equipment that can be used to implement any of the functions summarized above. The computing equipment includes a set of user computing devices 1102 coupled to a set of servers 1104 via a computer network 1106. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1106 can be implemented as a local area network, a wide area network (e.g., the Internet), one or more point-to-point links, or any combination thereof.

FIG. 11 also indicates that any of the training system 156, the ink-parsing system 102, and the downstream application(s) 124 can be spread across the user computing devices 1002 and/or the servers 1004 in any manner. For instance, in one case, the ink-parsing system 102 is entirely implemented by each user computing device. But in another implementation, any aspect of the functions performed by the ink-parsing system 102 can instead, or in addition, be performed by one or more remote servers. Although not shown in FIG. 11, each user computing device incorporates a local instance of the ink capture device 106. But here too, aspects of the processing performed by the ink capture device 106 can be allocated to a remote server or servers, and/or by another local device or devices.

Figure 12:
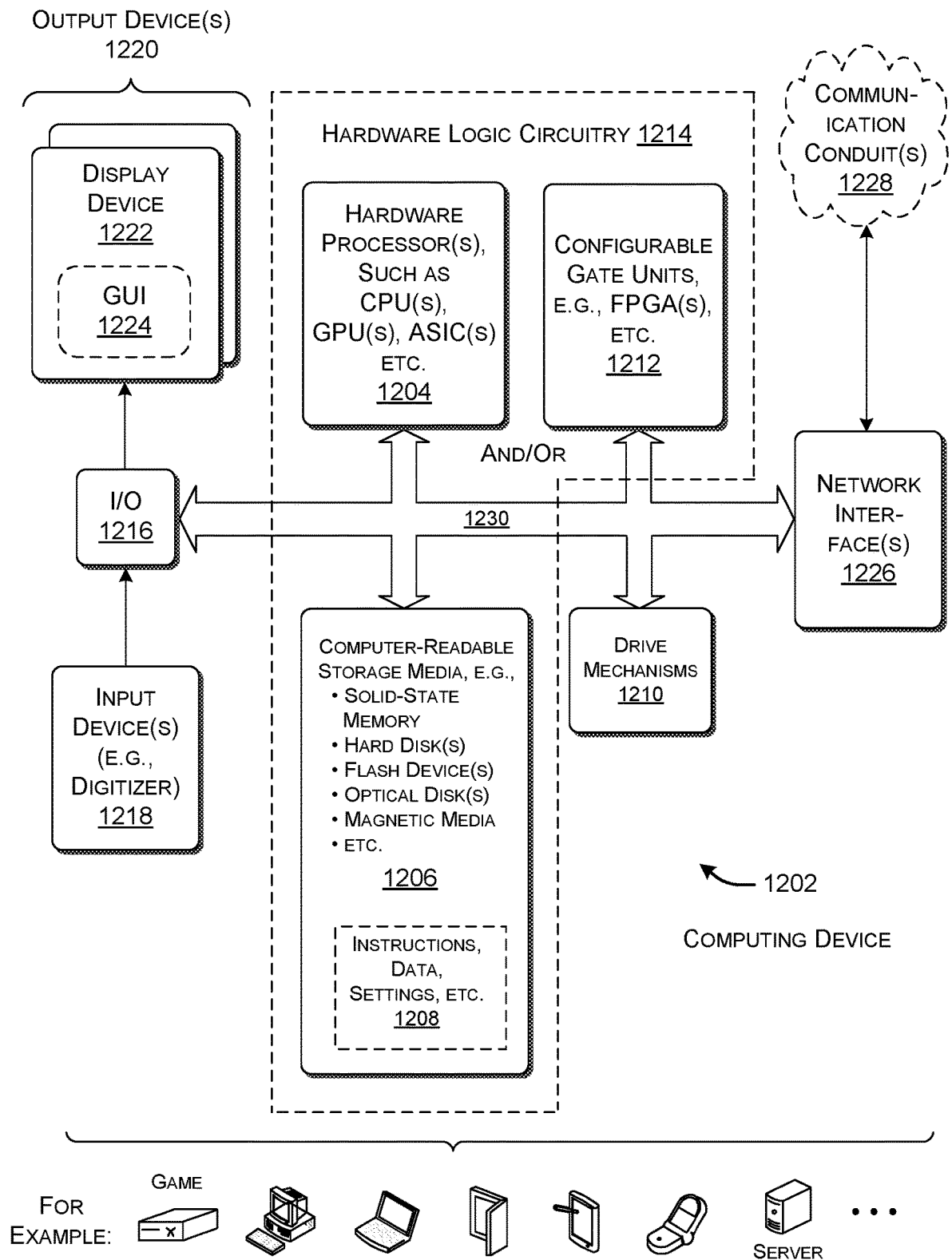
FIG. 12 shows an illustrative type of computing device that can be used by the computing equipment of FIG. 11.

FIG. 12 shows a computing device 1202 that can be used to implement any aspect of the computing equipment shown in FIG. 11. For instance, the type of computing device 1202 shown in FIG. 12 can be used to implement any user computing device or any server shown in FIG. 11. In all cases, the computing device 1202 represents a physical and tangible processing mechanism.

The computing device 1202 can include one or more hardware processors 1204. The hardware processor(s) 1204 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1202 can also include computer-readable storage media 1206, corresponding to one or more computer-readable media hardware units. The computer-readable storage media 1206 retains any kind of information 1208, such as machine-readable instructions, settings, data, etc. Without limitation, the computer-readable storage media 1206 may include one or more solid-state devices, one or more magnetic hard disks, one or more optical disks, magnetic tape, and so on. Any instance of the computer-readable storage media 1206 can use any technology for storing and retrieving information. Further, any instance of the computer-readable storage media 1206 may represent a fixed or removable unit of the computing device 1202. Further, any instance of the computer-readable storage media 1206 may provide volatile or non-volatile retention of information.

The computing device 1202 can utilize any instance of the computer-readable storage media 1206 in different ways. For example, any instance of the computer-readable storage media 1206 may represent a hardware memory unit (such as Random Access Memory (RAM)) for storing transient information during execution of a program by the computing device 1202, and/or a hardware storage unit (such as a hard disk) for retaining/archiving information on a more permanent basis. In the latter case, the computing device 1202 also includes one or more drive mechanisms 1210 (such as a hard drive mechanism) for storing and retrieving information from an instance of the computer-readable storage media 1206.

The computing device 1202 may perform any of the functions described above when the hardware processor(s) 1204 carry out computer-readable instructions stored in any instance of the computer-readable storage media 1206. For instance, the computing device 1202 may carry out computer-readable instructions to perform each block of the processes described in Section B.

Alternatively, or in addition, the computing device 1202 may rely on one or more configurable gate units 1212 to perform operations using a task-specific collection of logic gates. For instance, the configurable gate unit(s) 1212 may include a fixed configuration of hardware logic gates, e.g., that are created and set at the time of manufacture, and thereafter unalterable. Alternatively, or in addition, the configurable gate unit(s) 1212 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 12 generally indicates that hardware logic circuitry 1214 includes any combination of the hardware processor(s) 1204, the computer-readable storage media 1206, and/or the configurable gate unit(s) 1212. That is, the computing device 1202 can employ any combination of the hardware processor(s) 1204 that execute machine-readable instructions provided in the computer-readable storage media 1206, and/or one or more configurable gate unit(s) 1212 that perform operations using a fixed and/or programmable collection of hardware logic gates. More generally stated, the hardware logic circuitry 1214 corresponds to one or more hardware logic units of any type(s) that perform operations based on logic stored in and/or otherwise embodied in the hardware logic unit(s).

In some cases (e.g., in the case in which the computing device 1202 represents a user computing device), the computing device 1202 also includes an input/output interface 1216 for receiving various inputs (via input devices 1218), and for providing various outputs (via output devices 1220). Illustrative input devices include at least a digitizer, and may also include a keyboard, voice detection mechanism, etc. One particular output mechanism may include a display device 1222 and an associated graphical user interface presentation (GUI) 1224. Illustrative types of display devices where described above in Section A. The computing device 1202 can also include one or more network interfaces 1226 for exchanging data with other devices via one or more communication conduits 1228. One or more communication buses 1230 communicatively couple the above-described units together.

The communication conduit(s) 1228 can be implemented in any manner, e.g., by a local area computer network, a wide area computer network (e.g., the Internet), point-to-point connections, etc., or any combination thereof. The communication conduit(s) 1228 can include any combination of hardwired links, wireless links, routers, gateway functionality, name servers, etc., governed by any protocol or combination of protocols.

FIG. 12 shows the computing device 1202 as being composed of a discrete collection of separate units. In some cases, the collection of units may correspond to discrete hardware units provided in a computing device chassis having any form factor. FIG. 12 shows illustrative form factors in its bottom portion. In other cases, the computing device 1202 can include a hardware logic unit that integrates the functions of two or more of the units shown in FIG. 1. For instance, the computing device 1202 can include a system on a chip (SoC or SOC), corresponding to an integrated circuit that combines the functions of two or more of the units shown in FIG. 12.

The following summary provides a non-exhaustive set of illustrative examples of the technology set forth herein.

According to a first example, a computing system for parsing ink stroke data is described. The computing system includes hardware logic circuitry having one or more hardware processors and/or one or more configurable gate units. The hardware logic circuitry is configured to perform the operations of: receiving ink stroke data from an ink capture device, the ink stroke data describing a plurality of ink strokes in an ink document; performing stroke-level processing on the plurality of ink strokes in the ink document, to produce stroke-level information, the stroke-level information identifying at least one characteristic associated with each ink stroke; performing object-level processing on individual objects within the ink document, to produce object-level information, the object-level information identifying one or more groupings of ink strokes in the ink document; and parsing the ink document into constituent parts based on the stroke-level information and the object-level information.

According to a second example, the operations further include converting the ink stroke data into an ink image. The operation of performing stroke-level processing, or the operation of performing object-level processing, or both the operations of performing stroke-level processing and performing object-level processing operates on the ink image.

According to a third example, relating to the second example, the operation of performing stroke-level processing operates on the ink stroke data prior to the operation of converting, and the operation of performing object-level processing operates on the ink image.

According to a fourth example, relating to the second example, the operation of performing stroke-level processing operates on the ink image, and the operation of performing object-level processing operates on the ink image.

According to a fifth aspect, relating to the second example, the operations further include mapping the ink image into an image feature embedding. The operation of performing stroke-level processing and the operation of performing object-level processing operate on the image feature embedding.

According to a sixth example, relating to the fifth example, the hardware logic circuitry includes an encoder neural network that uses successive down-converting stages. The operation of mapping of the ink image into an image feature embedding uses the encoder neural network.

According to a seventh example, relating to the second example, the hardware logic circuitry includes a pixel classifier neural network. The operation of performing stroke-level processing classifies individual pixels in the ink image using the pixel classifier neural network. The operation of parsing includes, as a part thereof, classifying each ink stroke based on classifications of pixels that are included in the ink stroke.

According to an eighth example, relating to the seventh example, the pixel classifier neural network performs the stroke-level processing to produce an output image in plural successive up-converting stages, the output image identifying classifications for respective pixels in the output image.

According to a ninth example, relating to the eighth example, the object-level processing is performed for different image scales based on respective instances of image information generated by at least two of the successive up-converting stages of the pixel classifier neural network.

According to a tenth example, relating to the second example, the hardware logic circuitry includes an object-detector neural network. The operation of performing object-level processing uses the object-detector neural network to identify one or more bounding boxes in the ink image respectively associated with the one or more objects, each object being associated with a particular cluster of ink strokes.

According to an eleventh example, the operation of parsing includes: determining a stroke-based classification associated with a particular ink stroke based on the stroke-level information; determining an object-based classification associated with a particular object, the particular object being associated with a region in the ink image, and being associated with a particular grouping of ink strokes; determining whether the particular ink stroke intersects the region associated with the particular object; and determining whether the particular ink stroke is a member of the particular object based on a rule that specifies that: (1) the particular ink stroke is a member of the particular object when the particular ink stroke intersects the region by at least a prescribed amount, and the particular ink stroke and the particular object have a same classification; and (2) the particular ink stroke is not a member of the particular object when the particular ink stroke and the particular object do not have a same classification.

According to a twelfth example, relating to the eleventh example, the particular ink stroke also intersects another region associated with another object. The other object has an object-based classification that differs from the stroke-based classification. The rule assigns the particular ink stroke to the particular object that matches the stroke-based classification, and not the other object that does not match the stroke-based classification.

According to a thirteenth example, relating to the eleventh example, the operations further include converting the ink stroke data into an ink image. The operation of determining the object-based classification determines the object-based classification by performing processing on pixels in the ink image.

According to a fourteenth example, relating to the eleventh example, the operation of determining the object-based classification determines the object-based classification based on stroke-based classifications of the ink strokes in the particular grouping.

According to the fifteenth example, wherein, for one rule, the operation of parsing includes: determining a stroke-based classification associated with a particular ink stroke based on the stroke-level information; determining an object-based classification associated with a particular object, the stroke-based classification or the object-based classification, but not both the stroke-based classification and the object-based classification, being established with at least a prescribed confidence level; and assigning the particular ink stroke to whatever classification has been established with at least the prescribed confidence level.

According to a sixteenth example, a method of parsing ink stroke data is described. The method includes: receiving ink stroke data from an ink capture device, the ink stroke data describing a plurality of ink strokes in an ink document; converting the ink stroke data into an ink image; mapping the ink image into an image feature embedding; classifying individual pixels in the ink image based on the image feature embedding, to produce stroke-level information; identifying one or more objects within the ink image based on the image feature embedding, to produce object-level information; and parsing the ink document into constituent parts based on the stroke-level information and the object-level information.

According to a seventeenth example, relating to the sixteenth example, the operation of mapping uses an encoder neural network to produce the image feature embedding in plural successive down-converting stages. The operation of classifying of individual pixels uses a pixel classifier neural network to produce an output image in plural successive up-converting stages, the output image identifying classifications for respective pixels in the output image.

According to an eighteenth example, relating to the seventeenth example, the operation of identifying one or more objects is performed for different image scales based on respective instances of image information generated by at least two of the successive up-converting stages of the pixel classifier neural network.

According to a nineteenth example, relating to the sixteenth example, the operation of parsing includes: determining a stroke-based classification associated with a particular ink stroke based on the stroke-level information; determining an object-based classification associated with a particular object, the particular object being associated with a region in the ink image, and being associated with a particular grouping of ink strokes; determining whether the particular ink stroke intersects the region associated with the particular object; and determining whether the particular ink stroke is a member of the particular object based on a rule that specifies that: (1) the particular ink stroke is a member of the particular object when the particular ink stroke intersects the region by at least a prescribed amount, and the particular ink stroke and the particular object have a same classification; and (2) the particular ink stroke is not a member of the particular object when the particular ink stroke and the particular object do not have a same classification.

According to a twentieth example, a computer-readable storage medium for storing computer-readable instructions is described. The computer-readable instructions, when executed by one or more hardware processors, perform a method that includes: receiving ink stroke data from an ink capture device, the ink stroke data describing a plurality of ink strokes in an ink document; performing stroke-level processing on the plurality of ink strokes in the ink document, to produce stroke-level information, the stroke-level information identifying at least one characteristic associated with each ink stroke; performing object-level processing on individual objects within the ink image, to produce object-level information, the object-level information identifying one or more groupings of ink strokes in the ink document; determining a stroke-based classification associated with a particular ink stroke based on the stroke-level information; determining an object-based classification associated with a particular object, the particular object being associated with a region in the ink image, and being associated with a particular grouping of ink strokes; determining whether the particular ink stroke intersects the region associated with the particular object; and determining whether the particular ink stroke is a member of the particular object based on a rule. The rule specifies that: (1) the particular ink stroke is a member of the particular object when the particular ink stroke intersects the region by at least a prescribed amount, and the particular ink stroke and the particular object have a same classification; and (2) the particular ink stroke is not a member of the particular object when the particular ink stroke and the particular object do not have a same classification.

A twenty-first example corresponds to any combination (e.g., any logically consistent permutation or subset) of the above-referenced first through twentieth examples.

A twenty-second example corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first examples.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system for parsing ink stroke data, comprising:
    hardware logic circuitry including one or more hardware processors and/or one or more configurable gate units, configured to perform the operations of:
    receiving the ink stroke data from an ink capture device, the ink stroke data describing a plurality of ink strokes in an ink document;
    converting the ink stroke data into an ink image that is made up of a plurality of pixels;
    performing stroke-level processing on the plurality of ink strokes in the ink document to produce stroke-level information, the stroke-level information identifying a classification for each individual pixel in the ink image, each particular classification of a particular pixel indicating a most likely type of object to which the particular pixel corresponds;
    performing object-level processing on individual objects within the ink document to produce object-level information, the object-level information identifying a plurality of regions in the ink document that are likely to include a respective plurality of objects, each object of the plurality of objects including a grouping of ink strokes; and
    parsing the ink document into constituent parts based on the stroke-level information and the object-level information, the parsing including:
    determining a stroke-based classification associated with a particular ink stroke based on the stroke-level information, the stroke-based classification identifying a most likely type of object to which the particular ink stroke corresponds;
    determining, based on the object-level information, an object-based classification associated with a particular object in a particular region of the ink document identified by the object-level processing that includes a particular grouping of ink strokes, the object-based classification identifying a most likely type of the particular object in the particular region; and
    determining whether the particular ink stroke is a member of the particular object based on a combination of the stroke-based classification and the object-based classification.

2. The computing system of claim 1, wherein said performing stroke-level processing operates on the ink image, and wherein said performing object-level processing operates on the ink image.

3. The computing system of claim 1,
    wherein the operations further include mapping the ink image into an image feature embedding, and
    wherein said performing stroke-level processing and said performing object-level processing operate on the image feature embedding.

4. The computing system of claim 3,
    wherein the hardware logic circuitry includes an encoder neural network that uses successive down-converting stages, and
    wherein said mapping of the ink image into an image feature embedding uses the encoder neural network.

5. The computing system of claim 1,
    wherein the hardware logic circuitry includes a pixel classifier neural network,
    wherein said performing stroke-level processing classifies individual pixels in the ink image using the pixel classifier neural network, and
    wherein said parsing includes, as a part thereof, classifying the particular ink stroke based on classifications of pixels that are included in the particular ink stroke.

6. The computing system of claim 5, wherein the pixel classifier neural network performs said stroke-level processing to produce an output image in plural successive up-converting stages, the output image identifying classifications for respective pixels in the output image.

7. The computing system of claim 6, wherein the object-level processing is performed for different image scales based on respective instances of image information generated by at least two of the successive up-converting stages of the pixel classifier neural network.

8. The computing system of claim 1, wherein said parsing includes:
    determining whether the particular ink stroke intersects the particular region associated with the particular object; and
    determining whether the particular ink stroke is a member of the particular object based on a rule that specifies that: the particular ink stroke is a member of the particular object when the particular ink stroke intersects the particular region by at least a prescribed amount, and the particular ink stroke and the particular object have a same classification; and the particular ink stroke is not a member of the particular object when the particular ink stroke and the particular object do not have a same classification.

9. The computing system of claim 8,
    wherein the particular ink stroke also intersects another region associated with another object,
    wherein the other object has an object-based classification that differs from the stroke-based classification, and
    wherein the rule assigns the particular ink stroke to the particular object that matches the stroke-based classification, and not the other object that does not match the stroke-based classification.

10. The computing system of claim 1, wherein said determining the object-based classification determines the object-based classification by performing processing on the pixels in the ink image.

11. The computing system of claim 1, wherein said determining the object-based classification determines the object-based classification based on stroke-based classifications of the ink strokes in the particular grouping.

12. The computing system of claim 1,
    wherein the stroke-based classification or the object-based classification, but not both the stroke-based classification and the object-based classification, is established with at least a prescribed confidence level, and
    and wherein said determining whether the particular ink stroke is a member of the particular object includes assigning the particular ink stroke to whatever classification, the stroke-based classification or the object-based classification, has been established with at least the prescribed confidence level.

13. The computing system of claim 1,
wherein the hardware logic circuitry includes an object-detector neural network, and
wherein said performing object-level processing uses the object-detector neural network to identify a plurality of bounding boxes in the ink image respectively associated with the plurality of regions.

14. A method for parsing ink stroke data, comprising:
receiving the ink stroke data from an ink capture device, the ink stroke data describing a plurality of ink strokes in an ink document;
converting the ink stroke data into an ink image that is made up of a plurality of pixels;
performing stroke-level processing on the plurality of ink strokes in the ink document to produce stroke-level information, the stroke-level information identifying classifications of individual pixel in the ink image;
performing object-level processing on individual objects within the ink document to produce object-level information, the object-level information identifying a plurality of regions in the ink document that are likely to include a respective plurality of objects, each object of the plurality of objects including a grouping of ink strokes, the object-level processing being different than the stroke-level processing; and
parsing the ink document into constituent parts based on the stroke-level information and the object-level information, the parsing including:
determining a stroke-based classification associated with a particular ink stroke based on the stroke-level information, the stroke-based classification identifying a most likely type of object to which the particular ink stroke corresponds;
determining, based on the object-level information, an object-based classification associated with a particular object in a particular region of the ink document identified by the object-level processing that includes a particular grouping of ink strokes, the object-based classification identifying a most likely type of the particular object in the particular region; and
determining whether the particular ink stroke is a member of the particular object based on a combination of the stroke-based classification and the object-based classification.

15. The method of claim 14,
wherein said performing stroke-level processing classifies individual pixels in the ink image using the pixel classifier neural network, and
wherein said parsing includes, as a part thereof, classifying the particular ink stroke based on classifications of pixels that are included in the particular ink stroke.

16. The method of claim 15, wherein the pixel classifier neural network performs said stroke-level processing to produce an output image in plural successive up-converting stages, the output image identifying classifications for respective pixels in the output image.

17. The method of claim 16, wherein the object-level processing is performed for different image scales based on respective instances of image information generated by at least two of the successive up-converting stages of the pixel classifier neural network.

18. The method of claim 14, wherein said parsing includes:
determining whether the particular ink stroke intersects the particular region associated with the particular object; and
determining whether the particular ink stroke is a member of the particular object based on a rule that specifies that: the particular ink stroke is a member of the particular object when the particular ink stroke intersects the particular region by at least a prescribed amount, and the particular ink stroke and the particular object have a same classification; and the particular ink stroke is not a member of the particular object when the particular ink stroke and the particular object do not have a same classification.

19. The method of claim 14,
wherein the stroke-based classification or the object-based classification, but not both the stroke-based classification and the object-based classification, is established with at least a prescribed confidence level, and
and wherein said determining whether the particular ink stroke is a member of the particular object includes assigning the particular ink stroke to whatever classification, the stroke-based classification or the object-based classification, has been established with at least the prescribed confidence level.

20. A computer-readable storage medium for storing computer-readable instructions, one or more hardware processors executing the computer-readable instructions to perform a method that comprises:
receiving the ink stroke data from an ink capture device, the ink stroke data describing a plurality of ink strokes in an ink document;
performing stroke-level processing on the plurality of ink strokes in the ink document to produce stroke-level information, the stroke-level information identifying classifications of individual data items in the ink image;
performing object-level processing on individual objects within the ink document to produce object-level information, the object-level information identifying a plurality of regions in the ink document that are likely to include a respective plurality of objects, each object of the plurality of objects including a grouping of ink strokes, the object-level processing being different than the stroke-level processing; and
parsing the ink document into constituent parts based on the stroke-level information and the object-level information, the parsing including:
determining a stroke-based classification associated with a particular ink stroke based on the stroke-level information, the stroke-based classification identifying a most likely type of object to which the particular ink stroke corresponds;
determining, based on the object-level information, an object-based classification associated with a particular object in a particular region of the ink document identified by the object-level processing that includes particular grouping of ink strokes, the object-based classification identifying a most likely type of the particular object in the particular region; and
determining whether the particular ink stroke is a member of the particular object based on a combination of the stroke-based classification and the object-based classification.

* * * * *